Jan. 17, 1956    R. W. ANTHONY ET AL    2,730,793
BROACHING TOOL

Filed Oct. 21, 1953    2 Sheets-Sheet 1

INVENTORS
RUSSEL W. ANTHONY
JOSEPH A. PSENKA
BY Whittemore, Hulbert
& Belknap
ATTORNEYS Jan. 17, 1956    R. W. ANTHONY ET AL    2,730,793
BROACHING TOOL Filed Oct. 21, 1953    2 Sheets-Sheet 2

INVENTORS
RUSSEL W. ANTHONY
JOSEPH A. PSENKA
BY
Whittemore, Hulbert
& Belknap ATTORNEYS United States Patent Office 2,730,793
Patented Jan. 17, 1956

2,730,793

BROACHING TOOL

Russel W. Anthony and Joseph A. Psenka, Detroit, Mich., assignors to National Broach & Machine Company, Detroit, Mich., a corporation of Michigan Application October 21, 1953, Serial No. 387,471

9 Claims. (Cl. 29—95.1)

The present invention relates to a broach and method of making the same.

It is an object of the present invention to provide a broach characterized by the use of inserted cutting blades of a hard cutting material, such for example as tungsten carbide.

It is a further object of the present invention to provide a broach of the character described having removable cutting blades each of which is a flat disc and has parallel opposing side surfaces.

It is a further object of the present invention to provide a broach as described in the preceding paragraph in which the cutting blades are relatively thin flat discs.

It is a further object of the present invention to provide a method of making a broach which comprises forming a bar with a longitudinally extending rib, drilling wedge receiving recesses through the rib and into the body, and thereafter forming blade receiving pockets by feeding an end mill obliquely into the recesses from opposite sides of the bar to provide a blade receiving pocket having a flat blade engaging surface at one side thereof and two inclined blade supporting surfaces extending inwardly of the bar and intersecting said recesses.

It is a feature of the present invention to provide a broach comprising a bar having an elongated blade supporting rib, blade receiving pockets formed in the bar extending transversely through the rib and into the body of the bar, removable cutting blades in said pockets, and means removably clamping said blades in said pockets.

It is a further feature of the present invention to provide a broach as described in the preceding paragraph in which the pockets have flat blade supporting surfaces at one side thereof, and the blades have opposed flat side surfaces.

Other objects and features of the invention will become apparent as the description proceeds, especially when taken in conjunction with the accompanying drawings, wherein.

Figure 3:
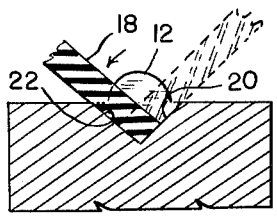
Figure 3 is a fragmentary section of the bar illustrating the manner in which blade receiving pockets are milled into the bar.

Referring now to the drawings, the broach is produced from a broach bar designated 10, which is herein illustrated as of rectangular section but may be cylindrical section (for round holes), having a blade supporting rib 12 which is of generally semi-cylindrical configuration. In order to produce the broach a series of cylindrical wedge receiving recesses 14 are drilled in the broach body through the rib 12. Thereafter, blade receiving pockets designated generally at 16 are formed in the body. Conveniently, these blade receiving pockets are produced as illustrated in Figure 3, by moving a small end mill 18 diagonally through the rib 12 into the recesses 14. The end mill illustrated in full lines in Figure 3 is at the end of its cut and it will be appreciated that movement of the end mill 18 to the illustrated position will have machined a flat smooth surface 20 and that in the partially completed condition the surface 22 will be arcuate. Thereafter, the end mill is moved to the position illustrated in dotted lines and is fed in to the depth position at which time the end of the end mill will machine the surface 22 to a flat surface. The end mill is located with reference to the inclined recesses 14 so that the end of the end mill comes out into the recess at the end of the stroke. Either before milling the blade receiving pocket or thereafter, the bottom of the wedge receiving recess is drilled and tapped to provide screw receiving recesses 24.

Figure 6:
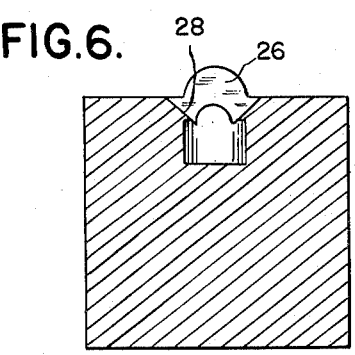
Figure 6 is a sectional view on the line 6—6, Figure 5.
Figure 5:
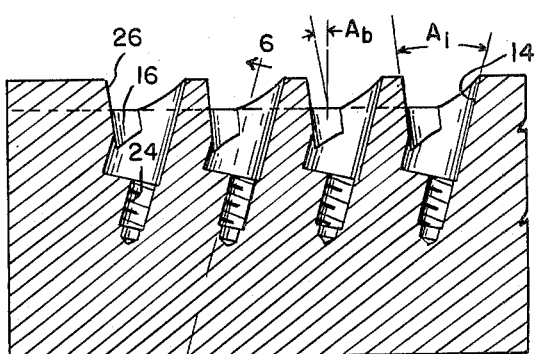
Figure 5 is a sectional view on the line 5—5, Figure 4.

It will be appreciated that the operation of milling the blade receiving pocket results in producing a flat side supporting surface 26, as best illustrated in Figures 5 and 6, and produces the oblique flat blade supporting surfaces 28.

Figure 8:
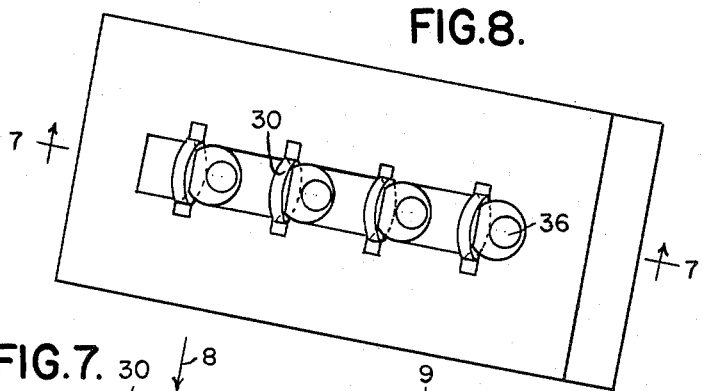
Figure 8 is a view similar to a plan view of the assembled broach looking in the direction of the arrow designated 8 in Figure 7.
Figure 7:
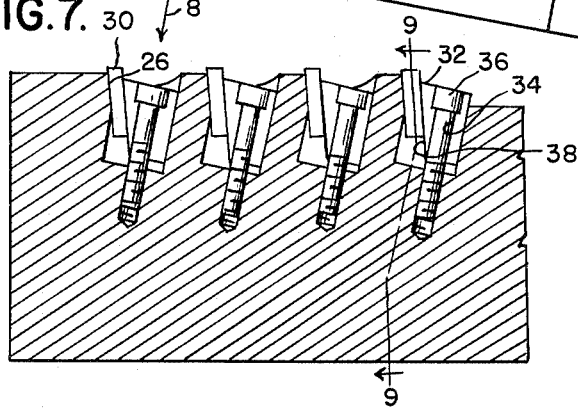
Figure 7 is a fragmentary longitudinal section of the assembled broach taken on the line 7—7, Figure 8.
Figure 9:
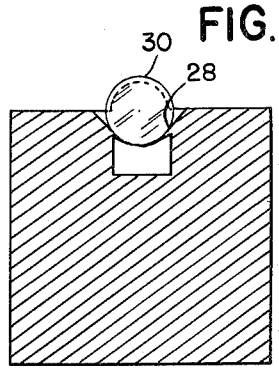
Figure 9 is a sectional view on the line 9—9, Figure 7.

Referring now to Figures 7, 8 and 9 the complete broach assembly is illustrated. Blades 30 are located in the blade receiving pockets with one flat side thereof abutting against the flat surface 26 and the lower portions of the blades resting upon the flat supporting surfaces 28.

The blades are firmly retained in assembled position by wedges 32 formed of cylindrical stock having screw receiving openings 34 and clamped in place by screws 36. One side of the wedges, as indicated at 38, is beveled off to provide a wedging surface engageable with the front surface of the corresponding blade 30.

While the present invention may be practiced with blades formed of any suitable cutting material, its principal advantages are achieved when the blades 30 are formed of a hard cutting material such for example as tungsten carbide. The blades as illustrated herein, are relatively thin flat cylindrical discs having parallel opposed sides. However, the shape of the blades may be varied in accordance with the nature of the work to be performed.

The pockets which receive the blades may be machined at a slight angle, as for example 5 degrees, from perpendicular to the longitudinal axis of the bar so that the blades are presented with rearward inclination, thus producing negative rake or hook at the top and cutting clearance in back of the top cutting edge. Moreover, it is contemplated that for the usual operation, the ribs 12 will extend at an angle to the direction of longitudinal cutting traverse of the broach, as for example illustrated in Figure 11. Accordingly, each successive blade cuts at its top and one side thereof only so that the cut of a series of blades associated with a single rib is caused to progress transversely during longitudinal movement of the broach. For this reason it is also desired that the pockets 16 shall be slightly inclined laterally of the broach so as to provide slight negative hook or rake at one side of the blades and as a result of this inclination, to produce corresponding slight cutting clearance in rear of the cutting edge at the side of the blade. Each blade cuts primarily at one side, with the depth of cut diminishing toward the top of the blade, the cut being of the type referred to as "side generated" or "nibbled."

Figure 10:
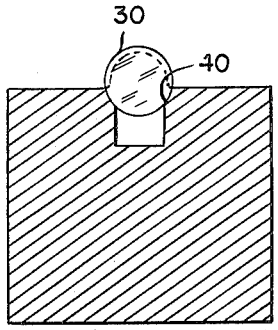
Figure 10 is a transverse sectional view through a broach produced by a different method of forming the blade receiving pockets.

Referring now to Figure 10 there is illustrated a slightly modified broach in which the blade supporting pocket is formed with arcuate blade supporting surfaces 40 rather than the straight inclined blade supporting surfaces 28 seen for example in Figure 9. The surfaces 40 may be produced by a cold forming operation. In this case a transverse slot may be cut by a suitable operation through the rib, the slot however being somewhat thinner than the desired final width of the blade seat. Thereafter, a shaving punch is moved into the body, the punch having a shaving edge and adapted to shave the surface of the previously formed slot to its full depth and thereafter to shape the surfaces 40 by displacement of metal.

Figure 11:
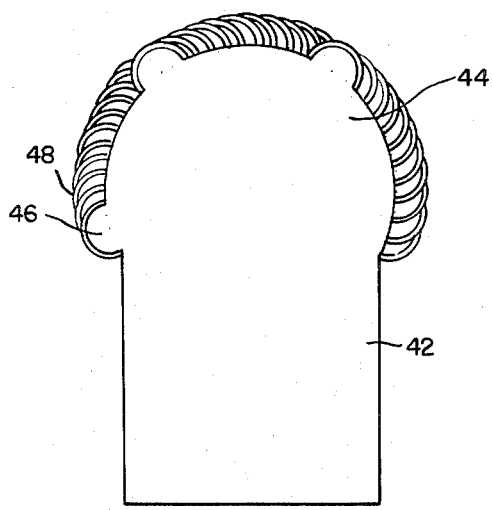
Figure 11 is an end view of a complete broach designed to broach a substantially arcuate recess.

Referring now to Figure 11 there is shown a bar 42 having a cylindrical portion 44 provided in this instance with a series of three helical ribs 46. Each of the helical ribs is provided with the blade receiving pockets as previously described and in the pockets are the blades, peripheral portions of which appear at 48. It will be appreciated that dependent upon the spacing of the blades and the helix angle or inclination of the rib, any desired degree of accuracy may be produced. Thus for example, the series of blades illustrated in Figure 11 is adapted to form a generally arcuate surface. If the surface is not as close to a true arcuate surface as desired, the number of ribs may be increased, the helix angle or angle of inclination of the ribs may be decreased, or the spacing of the blades longitudinally of the bar may be reduced.

Figure 1:
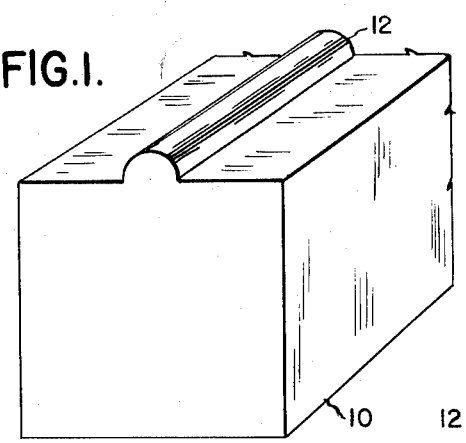
Figure 1 is a fragmentary elevational view of a bar used in producing the broach disclosed herein.
Figure 2:
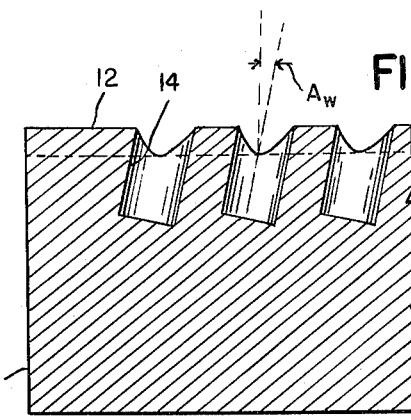
Figure 2 is a fragmentary section of the bar after wedge receiving recesses have been drilled therein.
Figure 4:
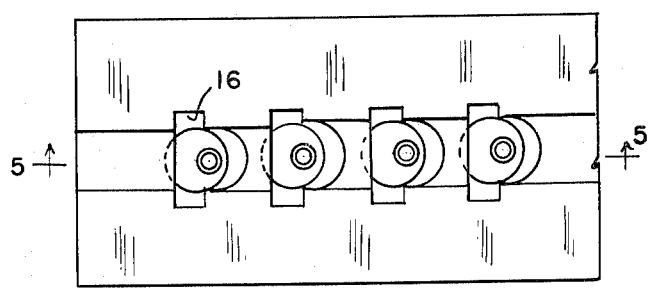
Figure 4 is a fragmentary elevational view of the bar with the recesses and blade receiving pockets formed therein.

It was previously stated that the present invention was particularly applicable to the use of hard material blades, such for example as tungsten carbide. This type of blade, as is well known, cuts efficiently at a negative hook or rake angle and this permits inclination of the blade at such a negative hook or rake angle in a manner to automatically produce the required cutting clearance in back of the cutting edge. In a typical example which has been tested and proved entirely satisfactory the wedge receiving recesses 14 were inclined at an angle $A_w$ of 11 degrees, as illustrated in Figure 2. The blade receiving pockets 16 were inclined at an angle $A_b$ of 4 degrees, the included angle $A_i$ between the flat surface 26 of the blade receiving pocket 16 and the axis or a side of the wedge receiving recess 14 being 15 degrees. In addition, the pockets 16 were inclined laterally from the position illustrated in Figure 4 at an angle, as for example 2½ degrees. This lateral inclination of the blades produces a shear type cut and in addition provides a negative rake or hook at the active side of the blades as well as automatic cutting clearance at the corresponding cutting side of the blade.

Inasmuch as the rib 12 is caused to conform closely to the periphery of the blade 30, the blade is given very strong support and is rigidly mounted. This is of particular importance in blades formed of hard material such for example as tungsten carbide. This material is somewhat brittle and requires very strong support.

Figure 12:
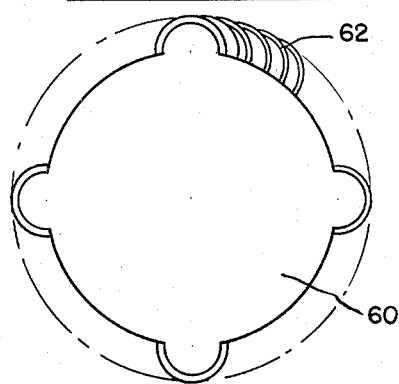
Figure 12 is an end view of a circular cross-section broach.

In Figure 12 there is illustrated a circular cross-section broach comprising a cylindrical bar 60 having blade receiving pockets disposed in helical paths and blades 62 mounted in the pockets.

The present invention permits the use of inserted and removable cutting blades formed of a hard cutting material which is extremely difficult to machine. By providing for the use of flat circular discs of this material, the production of the blades is rendered a simple matter and the blades are extremely economical to produce as well as efficient in use.

The drawings and the foregoing specification constitute a description of the improved broach and method of making the same in such full, clear, concise and exact terms as to enable any person skilled in the art to practice the invention, the scope of which is indicated by the appended claims.

What we claim as our invention is:

1. A broach comprising a bar having a blade supporting rib, said bar having a series of blade pockets extending transversely through said rib, blades in said pockets, and removable blade retainers engaging said blades and holding said blades in said pockets, said blades being flat and extending slightly above and laterally beyond said rib, said rib and blades having similar cross-sectional shape so that said blades are supported by said rib close to the projecting edges of said blades.

2. A broach comprising a bar having a blade supporting rib, said bar having a series of blade pockets extending transversely through said rib, blades in said pockets, and blade retainers engaging said blades and holding said blades in said pockets, said rib being of approximately partial cylindrical configuration, and said blades being flat cylindrical discs.

3. A broach comprising a bar having a blade supporting rib, said bar having a series of blade pockets extending transversely through said rib, blades in said pockets, and blade retainers engaging said blades and holding said blades in said pockets, said rib being of approximately partial cylindrical configuration, and said blades being flat cylindrical discs formed of a hard cutting material such as tungsten carbide.

4. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having wedge receiving recesses intersecting said pockets, flat cylindrical blades in said pockets, and wedges in said recesses clamping said blades against the flat surfaces of said pockets.

5. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having cylindrical wedge receiving recesses intersecting said pockets, flat cylindrical blades in said pockets, and cylindrical wedges in said recesses clamping said blades against the flat surfaces of said pockets.

6. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having wedge receiving recesses intersecting said pockets, flat cylindrical blades in said pockets, and wedges in said recesses clamping said blades against the flat surfaces of said pockets, said blades being formed of a hard material such as tungsten carbide.

7. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having wedge receiving recesses intersecting said pockets, flat cylindrical blades in said pockets, and wedges in said recesses clamping said blades against the flat surfaces of said pockets, said blades being formed of a hard material such as tungsten carbide, said pockets being inclined to produce a negative rake and top cutting clearance.

8. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having wedge receiving recesses intersecting said pockets, flat cylindrical blades in said pockets, and wedges in said recesses clamping said blades against the flat surfaces of said pockets, said rib being inclined to the direction of movement of said bar on its cutting stroke whereby the blades carried by each bar will produce a laterally progressive cut upon longitudinal movement of said bar.

9. A broach comprising a bar having a blade supporting rib of approximately semi-cylindrical shape extending outwardly therefrom, said bar having blade pockets extending transversely through said rib and into the body of said bar beneath said rib, said pockets having flat blade engaging surfaces for engaging the sides of cutting blades, said bar having wedge receiving recesses intersecting said pockets, flat cylindrical blades in said pockets, and wedges in said recesses clamping said blades against the flat surfaces of said pockets, said rib being inclined to the direction of movement of said bar on its cutting stroke whereby the blades carried by each bar will produce a laterally progressive cut upon longitudinal movement of said bar, said pockets being inclined to produce negative rake at the top and one side thereof and cutting clearance in back of the top and said one side thereof.

References Cited in the file of this patent

UNITED STATES PATENTS

| | | |
|---|---|---|
| 8,293 | Ripley | Aug. 12, 1851 |
| 1,359,831 | Oakley | Nov. 23, 1920 |
| 2,277,607 | Pope et al. | Mar. 24, 1942 |
| 2,390,722 | Markstrum | Dec. 12, 1945 |
| 2,398,310 | Howell | Apr. 9, 1946 |
| 2,402,650 | Maffia | June 25, 1946 |
| 2,467,302 | Forster et al. | Apr. 12, 1949 |
| 2,656,590 | Hooper | Oct. 27, 1953 |